United States Patent [19]
McNay et al.

[11] Patent Number: 5,907,371
[45] Date of Patent: *May 25, 1999

[54] CONNECTOR SWITCH APPARATUS WHICH CAN PROVIDE EITHER A SATELLITE OR CABLE TELEVISION SIGNAL OR A GHOST-FREE OFF-AIR TELEVISION SIGNAL

[75] Inventors: Steven R. McNay, Seymour, Tenn.; Richard A. Weiss, Edgewater, N.J.; Michael E. Marion, White Plains, N.Y.

[73] Assignee: Philips Electronics North America Corporation, New York, N.Y.

[ * ] Notice: This patent is subject to a terminal disclaimer.

[21] Appl. No.: 08/725,113

[22] Filed: Oct. 2, 1996

Related U.S. Application Data

[63] Continuation-in-part of application No. 08/496,719, Jun. 29, 1995, Pat. No. 5,654,766.

[51] Int. Cl.$^6$ ....................................................... H04N 5/21
[52] U.S. Cl. .......................... 348/706; 348/614; 348/731; 455/193.1; 455/284; 342/359
[58] Field of Search .................................... 348/705, 706, 348/611, 607, 614, 725, 731, 735; 342/75, 77, 96, 97, 98, 149, 159, 359; 455/6.1, 6.2, 3.2, 4.2, 193.1, 283, 269, 284, 286, 289; H04N 5/21, 5/50

[56] References Cited

U.S. PATENT DOCUMENTS

| | | | |
|---|---|---|---|
| 5,047,859 | 9/1991 | Koo | 358/187 |
| 5,111,298 | 5/1992 | Koo | 358/187 |
| 5,119,196 | 6/1992 | Alyanoglu et al. | 348/614 |
| 5,121,211 | 6/1992 | Koo | 358/187 |
| 5,172,232 | 12/1992 | Koo | 358/187 |
| 5,233,424 | 8/1993 | Naimura | 348/607 |
| 5,300,935 | 4/1994 | Yu | 348/731 |
| 5,428,405 | 6/1995 | Lee | 348/731 |
| 5,483,688 | 1/1996 | Eaglish | 455/931 |
| 5,574,440 | 11/1996 | Kurtz | 348/706 |
| 5,654,766 | 8/1997 | McNay | 348/614 |

OTHER PUBLICATIONS

W. Cicora et al, "A Tutorial on Ghost Cancelling in Television systems", vol. CE–25, No. 1, pp. 9–44 (Feb. 1979).

J. Huang, "A Ghost Cancellation system for the NTSC Television", IEEE Trans. on Consumer Electronics, vol. 39, No. 4, (Nov. 1993) pp. 896–904.

S. McNay, "Ghost Cancellation Implementation in Television and VCR", presented Jun. 7, 1995 at the International Conference on Consumer Electronics in Chicago, IL, Jun. 5–7, 1995 (published in the ICCE Digest of Technical Papers, IEEE Cat. #95CH35719, ISBN 0–7803–2140–5, 2141–3, 2142–1, Library of Congress 84–643147).

*Primary Examiner*—Michael Lee
*Attorney, Agent, or Firm*—Michael E. Marion

[57] ABSTRACT

Connector switch apparatus which can provide either a cable or satellite television signal or a ghost-free off-air television signal. The apparatus obtains the cable or satellite television signal from a cable or satellite tuner, which can be included in the apparatus; and includes a television tuning device for producing a ghost-free off-air television signal, and a switch which provides either of those signals. The television tuning device employs use of antenna directionality control and ghost cancellation to produce a ghost-free off-air television signal. In particular, the television tuning device obtains an off-air television signal from a antenna, which may or may not be included therein, whose directionality can be changed to change reception quality of a received off-air television signal; and includes a baseband ghost cancellation unit which can perform baseband ghost cancellation. In a first embodiment, the directionality of the antenna is changed so that an off-air television signal of sufficient reception quality is received from which a ghost-free off-air television signal can be produced therefrom by the ghost cancellation unit. In a second embodiment, the television tuning system further includes a tuner, and controls the directionality of the antenna and the tuning frequency of the tuner so that a tuned off-air television signal is produced which is properly tuned and of sufficient quality that a properly tuned ghost-free off-air television signal can be produced therefrom by the ghost cancellation unit.

29 Claims, 6 Drawing Sheets

CONNECTOR SWITCH APPARATUS WHICH CAN PROVIDE EITHER A SATELLITE OR CABLE TELEVISION SIGNAL OR A GHOST-FREE OFF-AIR TELEVISION SIGNAL

CROSS-REFERENCE TO RELATED APPLICATIONS

This is a continuation-in-part of application Ser. No. 08/496,719, filed Jun. 29, 1995 now U.S. Pat. No. 5,654,766 issued Aug. 5, 1997.

BACKGROUND OF THE INVENTION

1. Field of the Invention

The invention relates to a connector switch apparatus which can provide a signal from either of two sources. More particularly, the invention relates to a connector switch apparatus which can provide either a satellite or cable television signal or a ghost-free off-air television signal to a television or a television monitor (either hereinafter referred to as a "television").

2. Description of Related Art

With the development of cable and satellite television transmission, television viewers are shying away from receiving television signals, by means of a conventional antenna, from off-air television transmission. (Such a television signal is hereinafter referred to as an "off-air television signal".) Rather, television viewers are more and more often opting to receive television signals from cable or satellite television transmission. (Such a television signal is hereinafter referred to as a "satellite or cable television signal".) Two inter-related reasons for this are:

(a) television viewers do not want to have to manipulate a conventional television antenna which receives off-air television signals (e.g., a television viewer may need to physically adjust that antenna or its phase) so that better quality television images can be obtained therefrom, especially when no similar manipulation is required with respect to cable or satellite television signals to obtain good quality television images; and (b) the television images which have been obtained from television signals received via a conventional television antenna from off-air television transmission have not had as good a quality, because of ghosting, as those which have been obtained from television signals received from cable or satellite television transmission.

A problem or potential problem of cable and satellite television transmission is that they currently do not (such as in the case of DSS Satellite Television Systems) or may not now or in the future (such as in the case of cable television) transmit, in some or all markets, certain local programming which is transmitted via off-air television transmission and can be received by a television viewer by means of a conventional television antenna. As a result, in such markets, the only way in which a television viewer can obtain such local programming is by hooking up his or her television to a conventional television antenna. Because conventional televisions typically have only one television signal (i.e., R/F) input, a television viewer in such a market who wishes to have the ability to receive both cable or satellite television and such local programming cannot do so without additional equipment, unless he or she continuously connects and disconnects the R/F input to (a) (i) a cable box or the cable directly or (ii) a satellite antenna and tuner and (b) a conventional television antenna.

An existing solution to this problem is a conventional A/B switch, i.e., connecting the R/F input of a television to the output of the switch, and the inputs of the switch to a cable or satellite television tuner and a conventional television antenna, respectively. However, that solution does not solve either of the following two problems, mentioned above:

(a) a television viewer will still have to manipulate a conventional television antenna to obtain better quality television images from off-air television signals; and (b) the television images which a television viewer obtains from off-air television signals, by means of a conventional television antenna, will not be as good as those obtained from cable or satellite television signals, because of ghosting.

With respect to the latter, it is noted that the development of baseband ghost cancellation, described generally by W. Ciciora et al. in "A Tutorial On Ghost Cancelling in Television Systems", IEEE Trans. on Consumer Elec., Vol. CE-25, No. 1, pp 9–44 (February 1979), which is incorporated herein by reference, reduces the effects of ghosting on, thereby improving the quality of, the television images which are obtained from off-air television signals. (Methods and apparatus illustrating preferred methods of baseband ghost cancellation are described in U.S. Pat. Nos. 5,047,859, 5,111,298, 5,121,211, and 5,172,232, which are all incorporated herein by reference.) Nevertheless, the ability of baseband ghost cancellation to perform ghost cancellation, and the quantity of such ghost cancellation when it can be performed, is limited by the reception quality of a television signal received by a television. Accordingly, if the television signal which is received by a television and supplied to a baseband ghost cancellation unit is of poor reception quality, the baseband ghost cancellation unit may either not be able to perform ghost cancellation on that signal, or if it can perform ghost cancellation, not be able to perform sufficient ghost cancellation to produce a television signal from which substantially ghost-free images can be obtained. (That type of television signal is hereinafter referred to as a "ghost-free television signal".)

SUMMARY OF THE INVENTION

In view of the above, there is a need for a connector switch apparatus which can provide to a television both, but one at a time, (a) a satellite or cable television signal and (b) a ghost-free off-air television signal (which thereby has substantially the same quality as the satellite or cable television signal), where the latter is produced without a television viewer having to manipulate an antenna. The invention achieves this result by incorporating in a connector switch, in accordance with the invention, a television tuning device which both performs baseband ghost cancellation on, and can automatically change the reception quality of, an off-air television signal received by means of an antenna of the type which can be automatically rotated (such as a rotatable antenna) or adjusted (such an electronic phase adjust antenna). (Such an antenna is hereinafter simply referred to as an "antenna".) Such a television tuning device is described in co-pending parent application Ser. No. 08/496,719, which is incorporated herein by reference. It operates by automatically setting the directionality of the antenna such that an off-air television signal which is received thereby is of sufficient reception quality that a baseband ghost cancellation unit can produce a ghost cancelled television signal therefrom which is a ghost-free television signal, and thereby enables the connector switch apparatus to provide a ghost-free off-air television signal to a television. (As used herein, the position, phase or directional setting of an antenna which can be automatically rotated or adjusted is the "directionality" of the antenna, and rotating the position or setting or adjusting the phase or setting of an antenna is hereinafter referred to as "changing the directionality" of the antenna.)

A connector switch apparatus, in accordance with the invention, comprises: (a) an obtaining means (e.g., a tuner or an input coupled thereto) for obtaining a cable or satellite television signal; (b) a television tuning device which can automatically produce a ghost-free off-air television signal from an off-air television signal obtained thereby from an antenna unit having an antenna which receives the off-air television signal and whose directionality can be changed to change reception quality of the off-air television signal; and (c) a selection unit (e.g., a switch), coupled to the obtaining means and the television tuning device, for providing either the cable or satellite television signal or the ghost-free off-air television signal. The television tuning device includes (i) a baseband ghost cancellation unit for receiving and performing baseband ghost cancellation on the off-air television signal to produce a ghost cancelled television signal; and (ii) a control unit for controlling the directionality of the antenna so that reception quality of the off-air television signal is sufficient that the ghost cancelled television signal is a ghost-free off-air television signal. The antenna unit can be, but does not have to be, included in the apparatus, and in particular, in the television tuning device.

Further, by coordinating the operations of the antenna and a tuner (and the baseband ghost cancellation unit, as well) together, the television tuning device can produce a properly tuned ghost-free off-air television signal. This is achieved, in accordance with the invention, by automatically setting the directionality of the antenna and the tuning frequency of the tuner such that the (tuned) off-air television signal which is produced by the latter and supplied to the baseband ghost cancellation unit is properly tuned and of sufficient reception quality that the baseband ghost cancellation unit can produce a ghost cancelled television signal which is a properly tuned ghost-free off-air television signal.

A connector switch apparatus in accordance with this aspect of the invention comprises: (a) an obtaining means for obtaining a cable or satellite television signal; (b) a television tuning device which can automatically produce a properly tuned ghost-free off-air television signal from an off-air television signal obtained thereby from an antenna unit having an antenna which receives the off-air television signal and whose directionality can be changed to change reception quality of the off-air television signal; and (c) a selection unit, coupled to the obtaining means and the television tuning device, for providing either the cable or satellite television signal or the properly tuned ghost-free off-air television signal. The television tuning device includes (i) a tuner for receiving and tuning the off-air television signal to a tuning frequency to produce a tuned off-air television signal; (ii) a baseband ghost cancellation unit, coupled to the tuner, for receiving and performing baseband ghost cancellation on the tuned off-air television signal to produce a ghost cancelled television signal; and (iii) a control unit for controlling the directionality of the antenna and the tuning frequency to which the off-air television signal is tuned by the tuner so that the tuned off-air television signal is properly tuned and of sufficient quality that the ghost cancelled television signal is a properly tuned ghost-free off-air television signal. As before, the antenna unit can be, but does not have to be, included in the apparatus, and in particular, in the television tuning device.

Each time a television tuning device, in accordance with the invention, which receives an off-air television signal begins operating or a television viewer selects a different channel, the directionality of the antenna and the ghost cancellation coefficients will need to be changed in order to obtain a ghost-free off-air television signal (and the tuning frequency of the tuner, as well, to obtain a properly tuned ghost-free off-air television signal). Accordingly, it is desirable to store an antenna directionality setting (and a tuning frequency setting) and possibly ghost cancellation coefficients for each channel which will produce a (properly tuned) ghost-free off-air television signal, after that (those) setting(s) and those coefficients have been obtained, so that each time a television viewer changes to that channel the directionality of the antenna (and the tuning frequency) and the coefficients of the baseband ghost cancellation unit can be automatically set to produce a (properly tuned) off-air ghost-free television signal. By providing the above-described apparatus with a storage device, that (those) setting(s) and coefficients can be stored once obtained. Thereafter, they can be obtained and used to produce a (properly tuned) ghost-free off-air television signal.

BRIEF DESCRIPTION OF THE DRAWINGS

The invention will now be described in greater detail with reference to the following illustrative drawings, in which.

DESCRIPTION OF THE PREFERRED EMBODIMENTS

Figure 1:
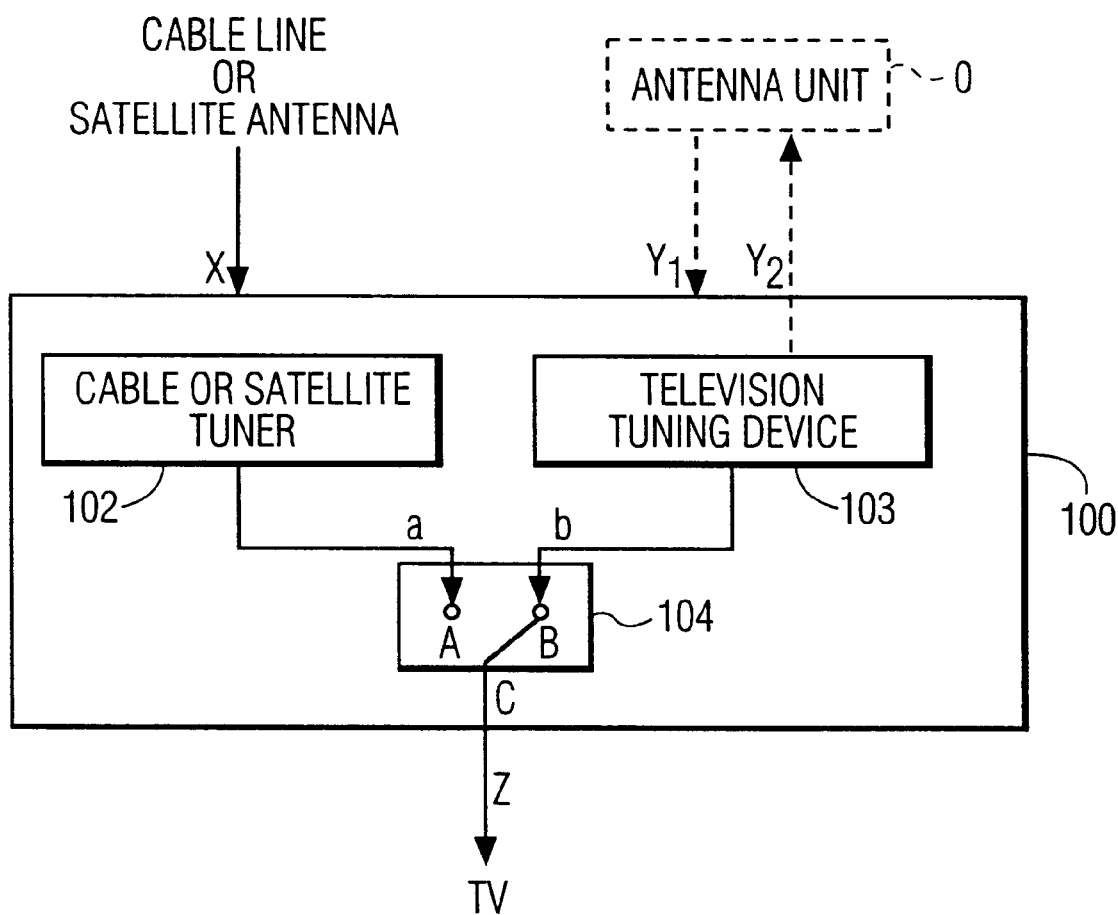
FIG. 1 is a block diagram of a connection switch apparatus in accordance with the invention.

FIG. 1 shows a connection switch apparatus 100 in accordance with the invention. Connection switch apparatus 100 includes an A/B switch 101, a cable or satellite tuner 102 and a television tuning device 103; and has an input x and an output z.

Input x receives either cable television signals, via being coupled to a cable line, when tuner 102 is a cable tuner; or satellite television signals, via connection to a satellite antenna, when tuner 102 is a satellite tuner. The television signals obtained by input x are supplied to the input of tuner 102.

For receiving cable television signals, tuner 102 can be a standard tuner of the type used in cable boxes. For receiving satellite television signals, tuner 102 can be a standard satellite tuner. That tuner can also have the ability to adjust the satellite antenna it is coupled to so that it can receive television signals from more than just one satellite (no control signal line from tuner 102 for this purpose is shown).

The output of tuner 102 is coupled to input a of switch 101, and the output of tuning device 103 is coupled to input b of switch 101. It should be noted that tuner 102 need not be included in connector switch apparatus 100. Instead, its output could be coupled to input x, and input x could be coupled directly to input a of switch 101.

Switch 101 is a standard A/B switch which can switch between the connection of output c to input a, so as to provide a cable or satellite television signal to output z, or to input b, so as to provide a ghost-free off-air television signal to output z. Switch 101 can be a standard hardware switch which can be physically switched between two positions, one corresponding to connection a-c and the other corresponding to connection a-b. Alternatively, switch 101 can be of a type which is switched between connection a-c and connection a-b on the basis of a control signal generated by a control signal generator (not shown). In a preferred embodiment, the control signal generator is of a type which receives a signal from a remote control indicating whether a television viewer wishes to be tuned to cable or satellite television or an off-air television, and provides an appropriate signal to switch 101 to ensure that the appropriate corresponding connection a-c or a-b is made so that output c provides output z the appropriate television signal. That remote control is also preferably used to control tuner 102 and tuning device 103.

Figure 2:
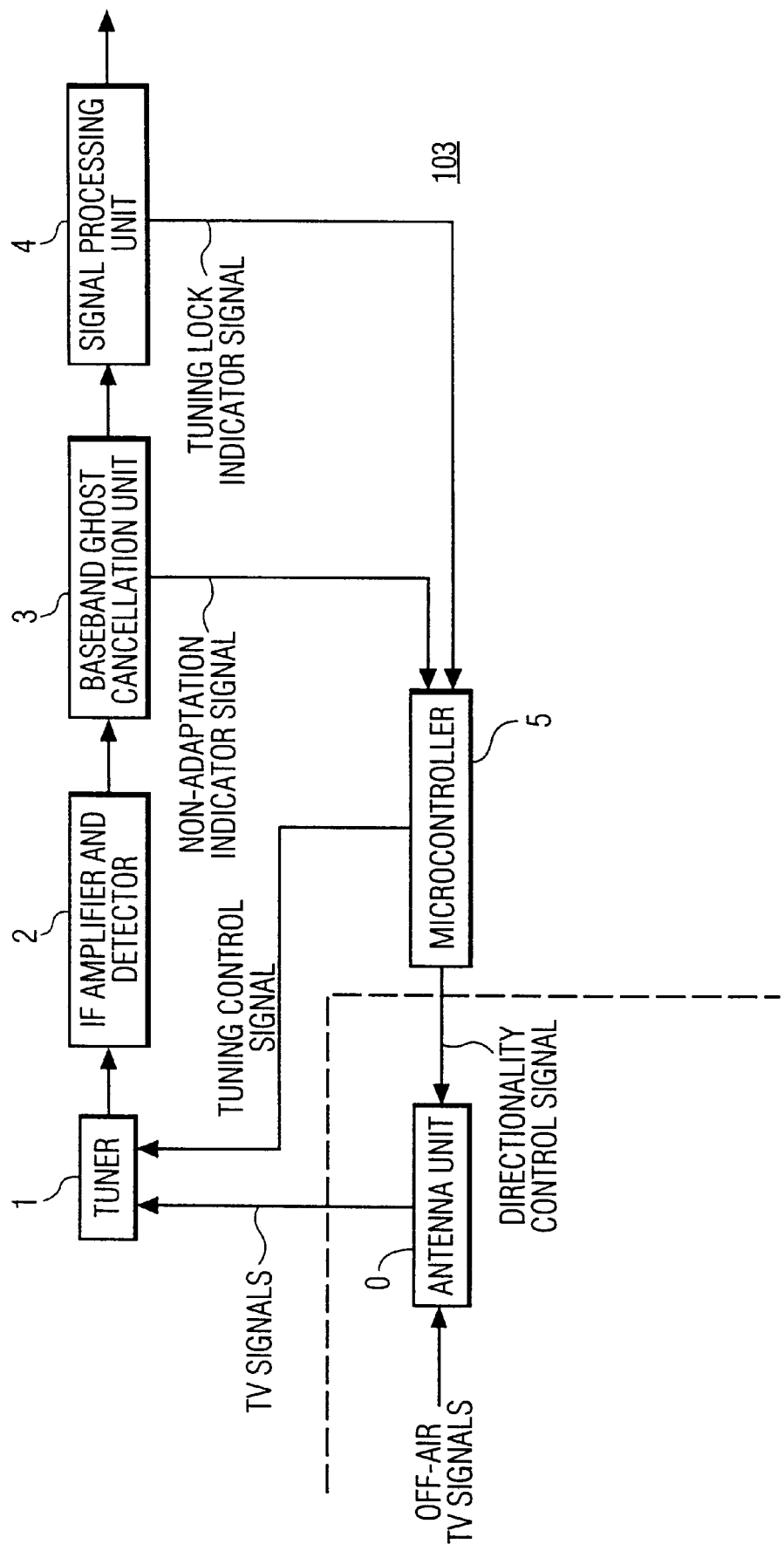
FIG. 2 is a block diagram of a television tuning device in accordance with the invention which can be included in the connection switch apparatus shown in FIG. 1.

FIG. 2 shows a block diagram of a preferred embodiment of television tuning device 103 in accordance with the invention. Tuning device 103 includes an antenna unit 0, a tuner 1, an IF amplifier and detector 2, a baseband ghost cancellation unit 3, a signal processing unit 4 and a microcontroller 5.

Antenna unit 0 is of a type which (a) receives off-air television signals via an antenna (not shown), and provides them to an output thereof, and (b) is capable of automatically changing the directionality of the antenna to change the reception quality of the off-air television signals it receives. Since in the preferred embodiment antenna 0 must be small and is inaccessible, because it is included in connection switch apparatus 100, it is preferably a phase change antenna or some other type of (small) antenna whose directionality can be changed electronically. In addition to the above mentioned output, antenna unit 0 also has a control input coupled to a first output of microcontroller 5 for receiving a directionality control signal produced by microcontroller 5 for controlling the directionality (i.e., position, phase, directional setting, etc. or a combination thereof) of the antenna.

It must be noted that antenna unit 0 need not be included in both tuning device 103 and connection switch apparatus 100. On the contrary, it can be separate from both and coupled thereto as shown in the broken lines shown in FIG. 1. Input Y1 of connection switch apparatus 100 receives the off-air television signals received by antenna unit 0 (and supplies them to tuner 1), and output Y2 supplies the directionality control signal produced by microcontroller 5 to antenna unit 0. Such an embodiment enables use of a conventional roof antenna which can be rotated.

The output of antenna unit 0 is coupled to a first input of tuner 1 which receives the off-air television signals. Tuner 1 is of a type known to those skilled in art which (a) receives off-air television signals over a tuning frequency range (e.g., over the tuning frequency ranges of 69 channels), (b) tunes to a tuning frequency within the tuning frequency range, and (c) produces a tuned off-air television signal at the tuning frequency. In addition to its first input, tuner 1 also has a control input coupled to a second output of microcontroller 5 for receiving a tuning control signal produced by microcontroller 5 for controlling the frequency at which tuner 1 is set, and an output for supplying the tuned off-air television signal.

The output of tuner 1 is coupled to an input of IF amplifier and detector 2 which receives the tuned off-air television signal. IF amplifier and detector 2 is of a type known to persons skilled in the art which (a) receives the tuned off-air television signal, (b) increases its strength and (c) and converts it into a baseband television signal, which is made available at an output of IF amplifier and detector 2.

The output of IF amplifier and detector 2 is coupled to an input of baseband ghost cancellation unit 3 which receives the baseband television signal. The baseband ghost cancellation unit 3 also has (a) a first output for supplying a ghost cancelled television signal produced therein from the baseband television signal, and (b) a second output for supplying to a first input of microcontroller 5 an non-adaption indicator signal when the baseband ghost cancellation unit (i) is not capable of performing ghost cancellation or (ii) is unable to provide sufficient ghost cancellation to produce a ghost cancelled television signal which is a ghost-free television signal. In-other-words, the non-adaption indictor signal is produced by baseband ghost cancellation unit 3 when the baseband ghost cancellation unit is unable to produce a ghost-free off-air television signal.

Since a detailed discussion of baseband ghost cancellation units is provided in U.S. Pat. Nos. 5,047,859, 5,111,298, 5,121,211, and 5,172,232, which, as stated above, are all incorporated herein by reference, a detailed discussion of baseband ghost cancellation unit 3 is unnecessary. Nevertheless, to aid in the understanding of the invention, and in particular when the non-adaption indicator signal is produced, a simplified version of baseband ghost cancellation unit 3 is shown in FIG. 3 and now briefly discussed.

Figure 3:
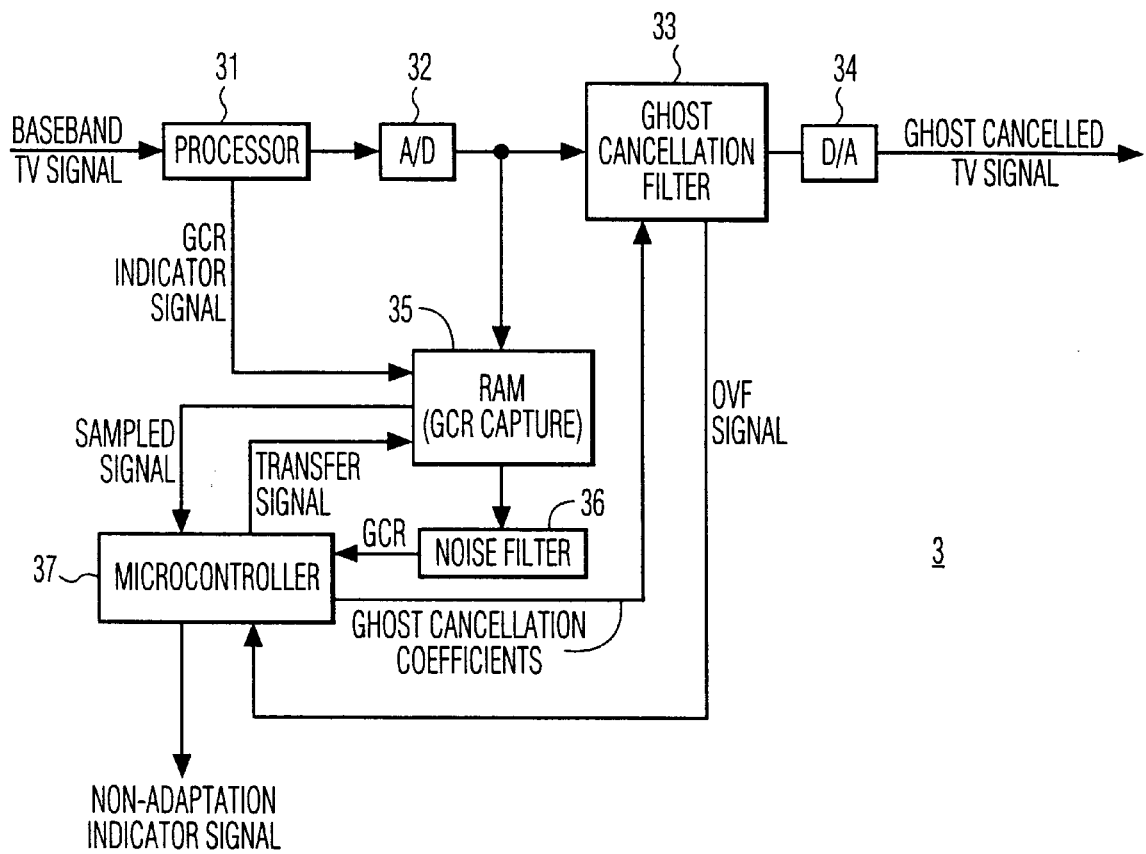
FIG. 3 is a block diagram of a baseband ghost cancellation unit in accordance with the invention which can be included in the tuning device shown in FIG. 2.

Baseband ghost cancellation unit 3 of FIG. 3 includes a processor 31, an A/D converter 32, a ghost cancellation filter 33, a D/A converter 34, a RAM 35, a noise filter 36 and a microcontroller 37. The processor 31 has an input (which corresponds to the input of baseband ghost cancellation unit 3 of FIG. 2), coupled to the output of the IF amplifier and detector of FIG. 2, for receiving the baseband television signal produced by IF amplifier and detector 2. Processor 31 (a) generates timing signals (only one of which is shown) from the baseband television signal for controlling timing functions of baseband ghost cancellation unit 3, and (b) supplies the baseband television signal via a first output to an input of A/D converter 32. A/ID converter 32 converts the baseband television signal into a digital television signal.

One of the timing signals produced by processor 31 is a GCR indicator signal which indicates where within the digital television signal the (now digital) GCR signal (which must be transmitted along with the transmitted original off-air television signal in order for the baseband ghost cancellation unit used in accordance with the invention to be used and operated in accordance with the invention) is supposed to be located. On the basis of the GCR indicator signal, which is supplied from a second output of processor 31 to a first input of RAM 35, RAM 35 samples, via a second input coupled to the output of A/D converter 32, the digital television signal at the location where the (digital) GCR signal is supposed to be located. RAM 35 has a first output, coupled to a first input of microcontroller 37, for supplying the signal that it sampled to microcontroller 37. If microcontroller 37 determines that the sampled signal corresponds to the (digital) GCR signal, then it supplies a transfer signal to RAM 35, via a first output of microcontroller 37 coupled to a third input of RAM 35. When the transfer signal is received by RAM 35, it supplies the (digital) GCR signal to noise filter 36, via a second output of RAM 35 coupled to an input of noise filter 36, which filters the (digital) GCR signal to remove noise. Thereafter, the noise reduced (digital) GCR signal is supplied to microcontroller 37, via an output of noise filter 36 to a second input of microcontroller 37, so that microcontroller 37 can determine ghost cancellation coefficients for ghost cancellation filter 33.

Ghost cancellation filter 33 has a first input coupled to the output of A/D converter 32 for receiving the digital television signal, and a second input coupled to a second output of microcontroller 37 for receiving the ghost cancellation coefficients. Ghost cancellation filter 33 can be a filter like the Zoran ZR33072 72-Tap Video-Rate Digital (Ghost Cancellation) Filter which is capable of performing baseband ghost cancellation on the digital television signal it receives on the basis of the ghost cancellation coefficients it receives. In addition, ghost cancellation filter 33 has a second output, coupled to a third input of microcontroller 37, for producing an overflow ("OVR") signal, like the Zoran ZR33072 filter, whenever ghost cancellation filter 33 is not producing a ghost cancelled digital television signal from which substantially ghost-free images can be produced as a result of (a) the digital television signal and/or (b) the ghost cancellation coefficients ghost cancellation filter 33 receives and uses. Ghost cancellation filter 33 also has a second output, coupled to an input of D/A converter 34, for supplying the ghost cancelled digital television signal to ID/A converter 34 for conversion back into an analog signal, i.e., into a ghost cancelled television signal. The ghost cancelled television signal is available at an output of the D/A converter 34 (which corresponds to the first output of ghost cancellation unit 3 of FIG. 2).

Microcontroller 37 of FIG. 2 can be a microprocessor, PROM, etc. which in addition to determining the ghost cancellation coefficients for use by ghost cancellation filter 33 is also able to produce the non-adaption indicator signal at a third output (which corresponds to the second output of baseband ghost cancellation unit 3 of FIG. 2) whenever baseband ghost cancellation unit 3 is unable to produce a ghost-free television signal. In a preferred embodiment, microcontroller 37 produces the non-adaption indicator signal in the following situations:

(a) when RAM 35 does not capture the (digital) GCR signal;

(b) when the signal to noise ratio of the noise reduced (digital) GCR signal is above a certain threshold, e.g., 25 dB; or (c) when ghost cancellation filter 33 produces the OVR signal.

It is noted that the situations in which ghost cancellation filter 33 will produce the OVR signal will vary depending upon the capabilities of that filter. In addition, it is also noted that baseband ghost cancellation unit 3 of FIG. 3 could also include a signal evaluation unit or processor (not shown) coupled to the second output of the ghost cancellation filter 33 or the output of the D/A converter 34 for measuring the quality of the signal at either, and supplying a triggering signal to microcontroller 37 to produce the non-adaption indicator signal if the signal at either output is deemed to be of a quality which would not enable substantially ghost-free images to be obtained from that signal.

The first output of baseband ghost cancellation unit 3 of FIG. 2 is coupled to an input of signal processing unit 4 which receives the ghost cancelled television signal. Signal processing unit 4 is of a type known to those skilled in the art. For purposes of this discussion and the invention, the only functions which signal processing unit 4 needs to perform are (a) to determine if the ghost cancelled television signal is property tuned, on the basis of specific signal characteristics known to persons skilled in the art, and (b) if so, to provide a tuning lock indicator signal at a first output thereof. The first output of signal processing unit 4 is coupled to a second input of microcontroller 5. Signal processing unit 4 also has a second output (corresponding to the output of tuning device 103 of FIG. 1) for making the ghost cancelled television signal available to input b of switch 101 of FIG. 1.

Microcontroller 5, which can be a microprocessor, PROM, etc. and is coupled to antenna control unit 0, tuner 1, baseband ghost cancellation unit 3 and signal processing unit 4, operates to cause tuning system 103 to operate in accordance with the invention. Specifically, microcontroller 5 controls the operations of antenna unit 0 and tuner 1 to ensure that the system produces a properly tuned ghost-free off-air television signal.

Figure 4:
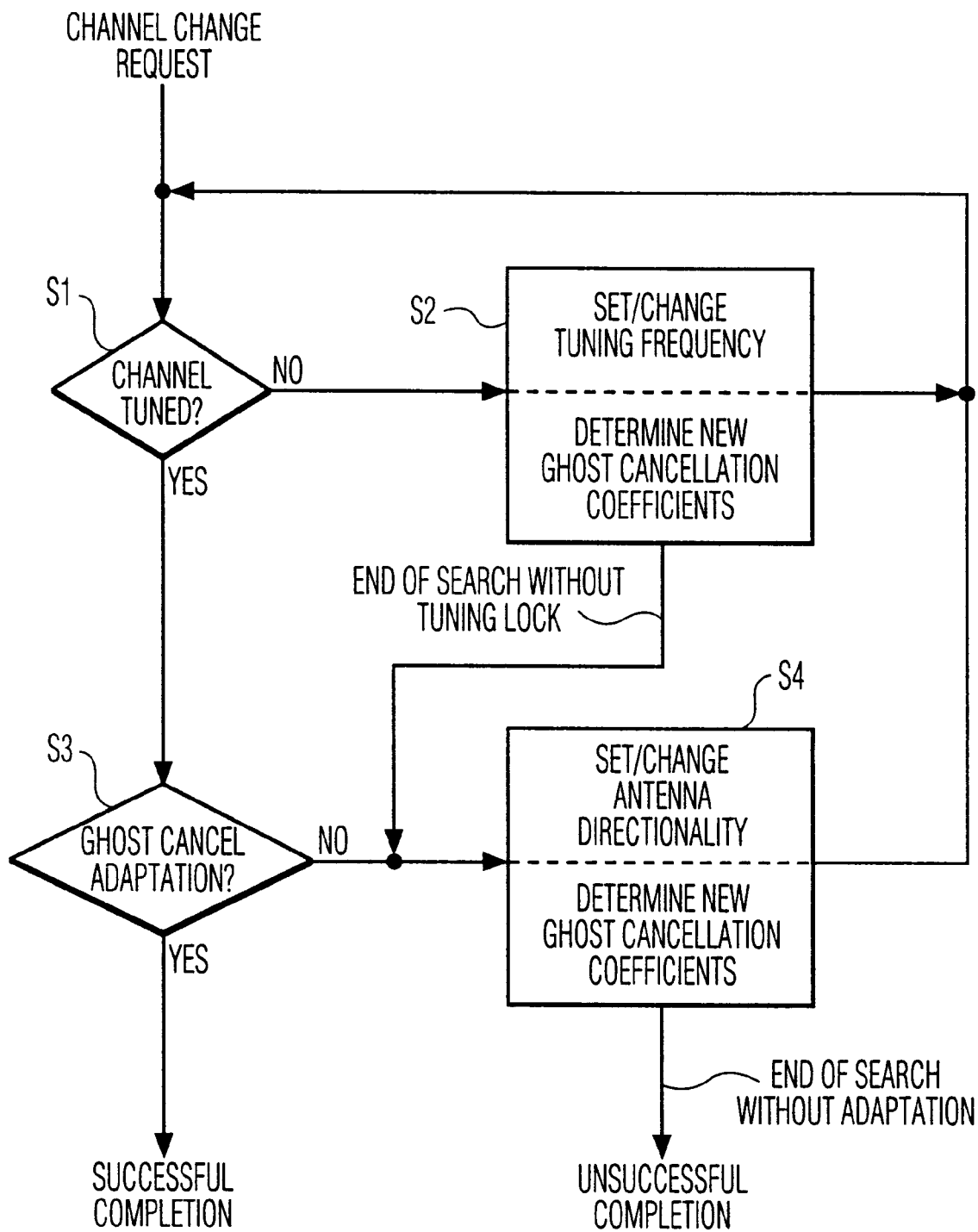
FIG. 4 is a flow chart showing a method in accordance with the invention.

FIG. 4 shows a method in accordance with the invention which may be performed by microcontroller 5. (For clarity purposes, the method of FIG. 4 is being discussed in terms of the device of FIG. 2.)

The method of FIG. 4 begins either when tuning device 103 is first turned on or a channel change request or selection is made by a viewer (via the above mentioned remote control). (Since when tuning device 103 is first turned on it typically selects the a preset channel, turning that tuner on is essentially the same as requesting or selecting a channel change. Accordingly, hereinafter, "channel change request" will refer to either turning on tuning device 103 or requesting or selecting a channel change.) It should be noted that when the method in accordance with the invention begins, the antenna of antenna unit 0 is either (a) set at a predetermined directionality setting (i.e., position, phase, directional setting, etc. or a combination thereof), or (b) a previously set directionality setting. Once a channel change request has been made, step S1 of FIG. 4 is performed. In step S1, microcontroller 5 of FIG. 2 determines whether a requested channel (e.g., channel 4) is tuned in on the basis of whether it receives the tuning lock indicator signal from signal processing unit 4.

If tuning locked in has not occurred, then step S2 is preformed. In step S2, microcontroller 5 causes tuner 1 to be set to a particular tuning frequency via a tuning control signal. This in turn causes baseband ghost cancellation unit 3 to determine ghost cancellation coefficients for use in performing ghost cancellation on the baseband television signal which results from the tuned off-air television signal produced by tuner 1 being set to the particular tuning frequency.

In a preferred embodiment, the first time step S2 is performed after a channel change request occurs (or the directionality of the antenna has been changed (see below)), microcontroller 5 causes tuner 1 to be set to an initial tuning frequency. Preferably, the initial tuning frequency is the lowest frequency in the tuning frequency range for the requested channel (e.g., if channel 4, which has a tuning frequency range of between 66 and 68 MHz, is requested, then the initial tuning frequency would be 66 MHz).

Once tuner 1 has been set to the initial tuning frequency, step S1 is performed again. If it is determined that the requested channel is not tuned in, then step S2 is repeat. This time, in the preferred embodiment, however, microprocessor 5 (in step S2) causes tuner 1 to be set to a different tuning frequency which is an incremental increase from the initial tuning frequency. Thereafter step S1 is repeated again, and, if tuning lock in has not occurred, then step S2 is also repeated again. Each time step S2 is performed after tuner 1 is set at the initial tuning frequency, the tuning frequency which microcontroller 5 cause tuner 1 to be set at is an incremental increase from the previous tuning frequency which tuner 1 is set at. The incremental increase is preferably 62.5 KHz. Steps S1 and S2 are repeated in the previously described manner until (a) the requested channel is tuned in or (b) tuner. 1 has been incremented to the highest tuning frequency in the tuning frequency range of the requested channel without tuning lock in having occurred.

If tuning lock in for the requested channel has occurred, then step S3 is performed. In step S3, a determination is made as to whether ghost cancellation adaption has occurred, i.e. whether baseband ghost cancellation unit 3 is able to produce a ghost-free television signal. As mentioned above, this determination is made by baseband ghost cancellation unit 3, and the results thereof are provided by whether microprocessor 37 produces and microprocessor 5 receives the non-adaption indicator signal.

If ghost cancellation adaption has not occurred, i.e., the non-adaption indicator signal has been received by microprocessor 5, then step S4 is preformed. In step S4, microcontroller 5 causes antenna unit 0 to change the directionality of the antenna by a predetermined amount, e.g., one directionality setting. This in turn causes baseband ghost cancellation unit 3 to determine ghost cancellation coefficients for use in performing ghost cancellation on the baseband television signal which results from the change in directionality.

Once step S4 has been performed, step S1 is repeated. If tuning lock in does not occur, then steps S3 is repeated. If tuning lock in does not occur (in step S1), then steps S2 and S1 are repeated until either (a) tuning lock in occurs or (b) tuner 1 has been incremented through the entire tuning frequency range of the requested channel without tuning lock in having occurred. If tuning lock does occur (in step S1), then step S3 is repeated. If at that point ghost cancellation adaption does not occur, then step S4 is repeated and the directionality of the antenna is changed again.

Step S4, followed by steps S1-S3 (as necessary) are repeated until (a) ghost cancellation adaption occurs (i.e., baseband ghost cancellation unit 3 is able to produced a ghost-free off-air television signal for a tuned in requested channel) or (b) the directionality of the antenna has been set at every directionality setting without ghost cancellation adaption having occurred. If in step S3, it is determined that ghost cancellation adaption has occurred, then the desired result is obtained from device of FIG. 2, i.e., production of a properly tuned ghost-free off-air television signal.

Since tuning device 103 in accordance with the invention is capable of automatically changing the directionality of the antenna of antenna unit 0 to enable baseband ghost cancellation unit 3 to produce a ghost-free off-air television signal, that device can also make use of that capability to aid in tuning. Accordingly, if tuner 1 has been incremented though the entire tuning frequency range of a requested channel without tuning lock in having occurred, then tuning device 103 can operate to change the directionality of the antenna to enable reception of an off-air television signal which can be locked in. This procedure is incorporated into the method of FIG. 4. Specifically, if step S2 of FIG. 4 has been performed enough times so that tuner 1 has been incremented to the highest tuning frequency in the tuning frequency range of the requested channel without tuning lock in having occurred, then step S4 is performed, and the directionality of the antenna is changed.

It is noted that the above-described processes for changing the directionality of the antenna and the tuning frequency of the tuner are only one way of performing each. Persons skilled in the art will be aware of numerous other ways of changing both so that all or substantially all directionality settings of an antenna, and (b) tuning frequencies in the tuning frequency range of a requested channel in combination are tried so that a properly tuned ghost-free off-air television signal can be produced.

Although the method described above with reference to FIG. 3 is extremely beneficial in finding a directionality setting, tuning frequency setting, and even ghost cancellation coefficients (the latter being obtainable from microcontroller 37 of FIG. 3) which will produce a properly tuned ghost-free television signal for a requested channel (such settings and coefficients hereinafter collectively referred to as "desired setting information"), the desired setting information must be obtain each time a different channel is requested. Since time is required to obtain the desired setting information for each channel, it is desirable to store and use that information after it has been obtained (unless there is a change in the transmission path or the channel characteristics), each time that channel is requested. An embodiment of tuning device 103 in accordance with the invention which can perform the task of obtaining the desired setting information for each channel, storing that information and then utilizing that information when that channel is again requested is shown in FIG. 5.

Figure 5:
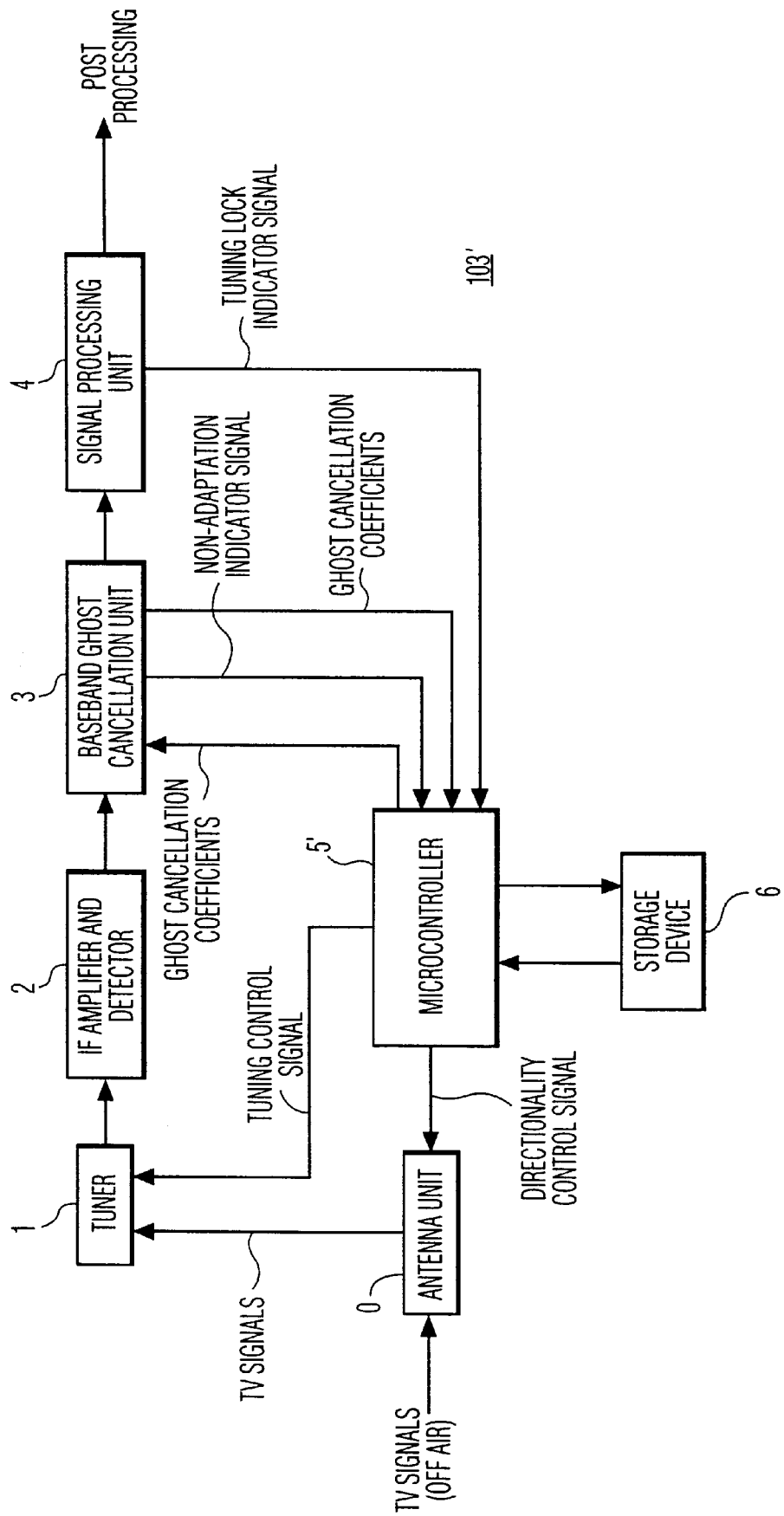
FIG. 5 is a block diagram of another embodiment of a television tuning device in accordance with the invention which can be included in the connection switch apparatus shown in FIG. 1.

The tuning device shown in FIG. 5 and referenced 103' is essentially the same as tuning device 103 shown in FIG. 2 (like elements having the same reference numbers), except tuning device 103' includes a storage device 6 coupled a microcontroller 5' via two communication paths, and additional communication paths between baseband ghost cancellation unit 3 and microcontroller 5'. Tuning device 103' operates in substantially the same way as tuning device 103, except for the feature discussed hereinafter.

Storage device 6 is a non-volatile memory unit, such as a RAM or the like, which is capable of (a) storing the desired setting information for each channel which an off-air television tuner can receive (e.g., 69), and (b) providing that information when requested to microprocessor 5'. Storage device 6 has an input for receiving the desired setting information for a requested channel from a fourth output of microprocessor 5', and an output for providing the desired setting information for a requested channel stored therein to microcontroller 5' via a fourth input coupled to the output of the storage device 6.

Microcontroller 5', like microcontroller 5 of FIG. 2 is a microprocessor, PROM or the like. Microcontroller 5' operates in substantially the same manner as microcontroller 5 (described above), but is also capable of (a) receiving the ghost cancellation coefficients which produce a (properly tuned) ghost-free off-air television signal for each requested channel from baseband ghost cancellation unit 3 (in particular, microcontroller 37 of FIG. 3); (b) providing the desired setting information for each channel the first time that channel it is requested to storage device 6 for storage therein; and (c) (i) retrieving the desired setting information for each channel from storage device 6 after that information has been stored in storage device 6, and (ii) using that information to set the directionality of the antenna of antenna unit 0, the tuning frequency of tuner 1 and the baseband ghost cancellation unit 3 (via setting its ghost cancellation coefficients) so that tuning device 103' can produce a (properly tuned) ghost-free off-air television signal. In a preferred embodiment, microcontroller 5' can be programmed to perform the method shown and described with respect to FIG. 4 for each of the channels which tuner 1 can obtain individually during a television set-up operation to obtain the desired setting information for each channel.

Figure 6:
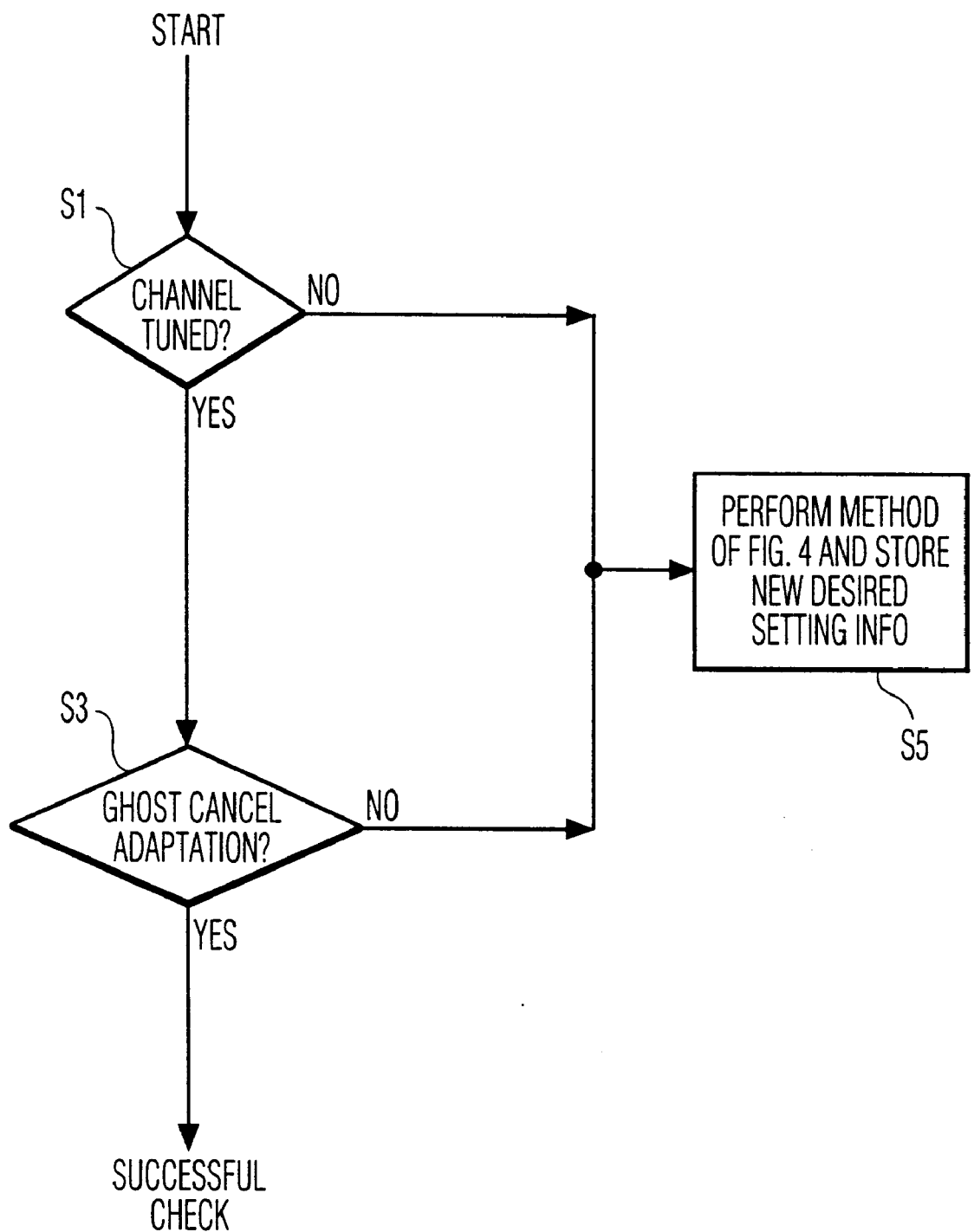
FIG. 6 is a flow chart of a method employed by the tuning device shown in FIG. 5 for checking whether it will produce a properly tuned ghost-free television signal.

After the desired setting information for a requested channel has been stored in storage device 6 and is being used to control tuning device 103', it is possible and beneficial to have microcontroller 5' periodically run through a check/update desired setting information method to make sure that stored and used desired setting information for a requested channel is resulting in tuning device 103' producing a (properly tuned) ghost-free off-air television signal, and if not, for updating that information. FIG. 6 shows such a method.

The method of FIG. 6 begins with step S1 of FIG. 3, i.e., a determination is made as to whether tuner 1 is tuned in. If it is, then steps S3 of FIG. 3 is performed, i.e., a determination is made as to whether ghost cancellation adaption has occurred. If it has, then a successful check has occurred. If, in the method of FIG. 6, it is determined that either tuner 1 is not tuned in (step S1) or ghost cancellation adaption has not occurred (step S3), then step S5 if performed. Step S5 involves repeating the method shown in FIG. 4 for a requested channel and then storing the new desired setting information in the storage device 6 for latter retrieval and use.

What is claimed is:

1. A connector switch apparatus, comprising:
   obtaining means for obtaining a cable or satellite television signal;
   a television tuning device which can automatically produce a ghost-free television signal from a second television signal obtained from an antenna unit having an antenna which receives the second television signal, said antenna having a directionality which can be changed to change reception quality of the second television signal, said television tuning device including:
      a baseband ghost cancellation unit for receiving and performing baseband ghost cancellation on the second television signal to produce a ghost cancelled television signal, and
      control means for controlling the directionality of said antenna so that reception quality of the second television signal is sufficient that the ghost cancelled television signal is ghost-free; and
   selection means, coupled to said obtaining means and said television tuning device, for providing either the cable or satellite television signal or the ghost-free television signal.

2. The apparatus as claimed in claim 1, wherein said obtaining means is a cable or satellite tuner.

3. The apparatus as claimed in claim 2, wherein said obtaining means is adapted to obtain the cable or satellite television signal from a cable line or a satellite antenna, respectively, which is not a part of the apparatus.

4. The apparatus as claimed in claim 1, wherein said obtaining means is an input of the apparatus adapted to obtain the cable or satellite television signal from a cable or satellite tuner, respectively, which is not a part of the apparatus.

5. The apparatus as claimed in claim 1, wherein said antenna unit is (a) included in the apparatus or said television tuning device and (b) coupled to said ghost cancellation unit and said control means.

6. The apparatus as claimed in claim 1, wherein said antenna unit is not a part of the apparatus, and said television tuning device is adapted for coupling to said antenna unit.

7. The apparatus as claimed in claim 1, wherein said antenna unit further has antenna directionality change means for changing the directionality of said antenna under the control of said control means.

8. The apparatus as claimed in claim 1, wherein said antenna is a rotatable or a phase adjustable antenna, and said antenna unit further has antenna directionality change means for changing the directionality of said antenna, under the control of said control means, by rotating the position or adjusting the phase of said antenna.

9. The apparatus as claimed in claim 1, wherein said antenna is set at a desired directionality setting when the ghost cancelled television signal is ghost-free, and said television tuning device further comprises storage means for storing the desired directionality setting.

10. The apparatus as claimed in claim 9, wherein said control means (a) obtains the desired directionality setting from said storage means, and (b) causes said antenna to be set at the desired directionality setting.

11. The apparatus as claimed in claim 9, wherein said ghost cancellation unit produces ghost cancellation coefficients for use therein in producing the ghost cancelled television signal, and said storage means further stores the ghost cancellation coefficients.

12. The apparatus as claimed in claim 11, wherein said control means (a) obtains the desired directionality setting and the ghost cancellation coefficients from said storage means, and (b) causes (i) said antenna to be set at the desired directionality and (ii) said ghost cancellation unit to obtain the ghost cancellation coefficients.

13. The apparatus as claimed in claim 1, wherein said control means (a) determines whether the second signal is a ghost-free television signal, and (b) causes the directionality of said antenna to be changed when the second television signal is not ghost-free until reception quality of the second television signal is sufficient that the second television signal is ghost-free.

14. The apparatus as claimed in claim 13, wherein said ghost cancellation unit includes non-adaption means for producing a non-adaption signal if the second television signal is not ghost-free, and said control means determines whether the ghost cancelled television signal is ghost-free on the basis of whether said non-adaption means produces the non-adaption signal.

15. A connector switch apparatus, comprising:
   obtaining means for obtaining a cable or satellite television signal;
   a television tuning device which can automatically produce a properly tuned ghost-free television signal from a second television signal obtained from an antenna unit having an antenna which receives the second television signal, said antenna having a directionality which can be changed to change reception quality of the second television signal, said television tuning device including:
      a tuner for receiving and tuning the second television signal to a tuning frequency to produce a tuned television signal,
      a baseband ghost cancellation unit, coupled to said tuner, for receiving and performing baseband ghost cancellation on the tuned television signal to produce a ghost cancelled television signal, and
      control means for controlling the directionality of said antenna and the tuning frequency to which the second television signal is tuned by said tuner so that the tuned television signal is properly tuned and of sufficient quality that the ghost cancelled television signal is a properly tuned ghost-free television signal; and selection means, coupled to said obtaining means and said television tuning device, for providing either the cable or satellite television signal or the properly tuned ghost-free television signal.

16. The apparatus as claimed in claim 15, wherein said obtaining means is a cable or satellite tuner.

17. The apparatus as claimed in claim 15, wherein said obtaining means is adapted to obtain the cable or satellite television signal from a cable line or a satellite antenna, respectively, which is not a part of the apparatus.

18. The apparatus as claimed in claim 15, wherein said obtaining means is an input of the apparatus adapted to obtain the cable or satellite television signal from a cable or satellite tuner, respectively, which is not a part of the apparatus.

19. The apparatus as claimed in claim 15, wherein said antenna unit is (a) included in the apparatus or said television tuning device, and (b) coupled to said tuner and said control means.

20. The apparatus as claimed in claim 15, wherein said antenna unit is not a part of the apparatus, and said television tuning device is adapted for coupling to said antenna unit.

21. The apparatus as claimed in claim 15, wherein said antenna unit further has antenna directionality change means for changing the directionality of said antenna under the control of said control means.

22. The apparatus as claimed in claim 15, wherein said antenna is a rotatable or a phase adjustable antenna, and said antenna unit further has antenna directionality change means for changing the directionality of said antenna, under the control of said control means, by rotating the position or adjusting the phase of said antenna.

23. The apparatus as claimed in claim 15, wherein said antenna is set at a desired directionality setting and the tuning frequency to which the second television signal is tuned is at a desired tuning frequency setting when the ghost cancelled television signal is a properly tuned ghost-free television signal, and said television tuning device further comprises storage means for storing the desired directionality setting and the desired tuning frequency setting.

24. The apparatus as claimed in claim 23, wherein said control means (a) obtains the desired directionality setting and the desired tuning frequency setting from said storage means, and (b) causes (i) said antenna to be set at the desired directionality setting and (ii) said tuner to be tuned to the desired tuning frequency setting.

25. The apparatus as claimed in claim 23, wherein said ghost cancellation unit produces ghost cancellation coefficients for use therein in producing the properly tuned ghost-free television signal, and said storage means further stores the ghost cancellation coefficients.

26. The apparatus as claimed in claim 25, wherein said control means (a) obtains the desired directionality setting, the desired tuning frequency setting and the ghost cancellation coefficients from said storage means, and (b) causes (i) said antenna to be set at the desired directionality setting, (ii) said tuner to be tuned to the desired tuning frequency setting and (iii) said ghost cancellation unit to obtain the ghost cancellation coefficients.

27. The apparatus as claimed in claim 15, wherein said control means (a) determines (i) whether the ghost cancelled television signal is ghost-free, and/or (ii) whether the second television signal can be properly tuned; and (b) causes the directionality of said antenna to be changed (i) when the ghost cancelled signal is not ghost-free, and/or (ii) when the second television signal cannot be properly tuned.

28. The apparatus as claimed in claim 15, wherein said control means (a) determines whether the ghost cancelled television signal is ghost-free, and (b) causes the directionality of said antenna to be changed when the ghost cancelled television signal is not ghost-free until reception quality of the second television signal is sufficient that the ghost cancelled television signal is ghost-free.

29. The apparatus as claimed in claim 28, wherein said ghost cancellation unit includes non-adaption means for producing a non-adaption signal if the ghost cancelled television signal is not ghost-free, and said control means determines whether the ghost cancelled television signal is ghost-free on the basis of whether said non-adaption means produces the non-adaption signal.

* * * * *